United States Patent
Schneider et al.

(10) Patent No.: US 10,747,474 B2
(45) Date of Patent: Aug. 18, 2020

(54) ONLINE CLUSTER EXPANSION FOR STORAGE SYSTEM WITH DECOUPLED LOGICAL AND PHYSICAL CAPACITY

(71) Applicant: EMC IP Holding Company LLC, Hopkinton, MA (US)

(72) Inventors: Zvi Schneider, Tel Aviv (IL); Uri Shabi, Tel Mond (IL); Maor Rahamim, Ramla (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 75 days.

(21) Appl. No.: 16/166,637

(22) Filed: Oct. 22, 2018

(65) Prior Publication Data
US 2020/0125265 A1    Apr. 23, 2020

(51) Int. Cl.
*G06F 3/06* (2006.01)

(52) U.S. Cl.
CPC .............. *G06F 3/067* (2013.01); *G06F 3/061* (2013.01); *G06F 3/0607* (2013.01); *G06F 3/0631* (2013.01); *G06F 3/0652* (2013.01); *G06F 3/0662* (2013.01)

(58) Field of Classification Search
CPC ........ G06F 3/067; G06F 3/0607; G06F 3/061; G06F 3/0631; G06F 3/0652; G06F 3/0662
See application file for complete search history.

(56) References Cited

U.S. PATENT DOCUMENTS

| | | | |
|---|---|---|---|
| 7,444,464 | B2 | 10/2008 | Urmston et al. |
| 8,095,726 | B1 | 1/2012 | O'Connell et al. |
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Ryan Bertram
(74) *Attorney, Agent, or Firm* — Ryan, Mason & Lewis, LLP

(57) ABSTRACT

An apparatus in one embodiment comprises at least one processing device comprising a processor coupled to a memory. The processing device is configured, in conjunction with an online cluster expansion process for a clustered storage system having an address space distributed across a set of storage controllers each associated with one or more storage devices, to modify the distribution of the address space across the set of storage controllers responsive to adding at least one of compute and storage capacity to the set of storage controllers of the clustered storage system. The processing device is also configured to identify a set of pending input-output requests directed to deletion of data in the clustered storage system, and to execute the set of pending input-output requests prior to relocating data in the clustered storage system based at least in part on the modified distribution of the address space.

20 Claims, 7 Drawing Sheets

(56) References Cited

U.S. PATENT DOCUMENTS

| | | | |
|---|---|---|---|
| 9,552,258 B2 | 1/2017 | Hallak et al. | |
| 9,606,870 B1 | 3/2017 | Meiri et al. | |
| 9,716,754 B2 | 7/2017 | Swift | |
| 10,296,451 B1* | 5/2019 | Schneider | G06F 11/1076 |
| 2008/0279462 A1 | 11/2008 | Celi, Jr. | |
| 2009/0132955 A1 | 5/2009 | Garg et al. | |
| 2010/0179941 A1 | 7/2010 | Agrawal et al. | |
| 2010/0313063 A1* | 12/2010 | Venkataraja | G06F 9/5022 714/4.1 |
| 2012/0124282 A1* | 5/2012 | Frank | G06F 3/061 711/108 |
| 2013/0325824 A1 | 12/2013 | Shoens | |
| 2014/0181016 A1 | 6/2014 | Whitehead et al. | |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2017/0192857 A1 | 7/2017 | Meiri et al. | |
| 2017/0199770 A1* | 7/2017 | Peteva | G06F 9/5088 |
| 2018/0089081 A1* | 3/2018 | Ramalingam | G11C 16/26 |
| 2018/0260125 A1* | 9/2018 | Botes | G06F 16/275 |
| 2018/0321993 A1* | 11/2018 | McClory | G06F 9/546 |
| 2019/0220454 A1* | 7/2019 | Matsui | G06F 3/0611 |
| 2019/0227781 A1* | 7/2019 | Ramasamy | G06F 8/65 |
| 2019/0243553 A1* | 8/2019 | Yamamoto | G06F 3/0658 |
| 2019/0294339 A1* | 9/2019 | Bolkhovitin | G06F 12/1072 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 15/884,577 filed in the name of Zvi Schneider et al. filed Jan. 31, 2018 and entitled "Storage System with Decoupling and Reordering of Logical and Physical Capacity Removal."

* cited by examiner

ONLINE CLUSTER EXPANSION FOR STORAGE SYSTEM WITH DECOUPLED LOGICAL AND PHYSICAL CAPACITY

FIELD

The field relates generally to information processing systems, and more particularly to storage in information processing systems.

BACKGROUND

In many storage systems, it is desirable to use clustering to provide improved performance. Over time, a clustered storage system may need to add or remove storage controllers and associated storage devices, either to replace failed or failing storage devices and storage controllers, or to increase capacity as the amount of data stored in the cluster increases. It is further desirable to provide for online cluster expansion, where such addition and removal of storage devices and storage controllers of the clustered storage system is performed while continuing to service input-output requests directed to data stored in the clustered storage system. Conventional approaches for such cluster expansion, however, can be problematic in terms of performance during the deletion or other release of physical capacity of the storage devices in the clustered storage system.

SUMMARY

Illustrative embodiments provide techniques for performing online cluster expansion in a clustered storage system that decouples logical and physical capacity deletion or release. Such embodiments can advantageously provide highly efficient cluster expansion that improves performance of the clustered storage system.

In one embodiment, an apparatus comprises at least one processing device comprising a processor coupled to a memory. The at least one processing device is configured, in conjunction with an online cluster expansion process for a clustered storage system having an address space distributed across a set of storage controllers each associated with one or more storage devices, to modify the distribution of the address space across the set of storage controllers responsive to adding at least one of compute and storage capacity to the set of storage controllers of the clustered storage system. The at least one processing device is further configured to identify a set of pending input-output requests directed to deletion of data in the clustered storage system, and to execute the set of pending input-output requests directed to deletion of data in the clustered storage system prior to relocating data in the clustered storage system based at least in part on the modified distribution of the address space.

The processing device in some embodiments is implemented in a host device configured to communicate over a network with at least one storage system that comprises at least one of the set of storage controllers. In other embodiments, the processing device is implemented in at least one of the set of storage controllers. These are only examples, and alternative implementations are possible.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
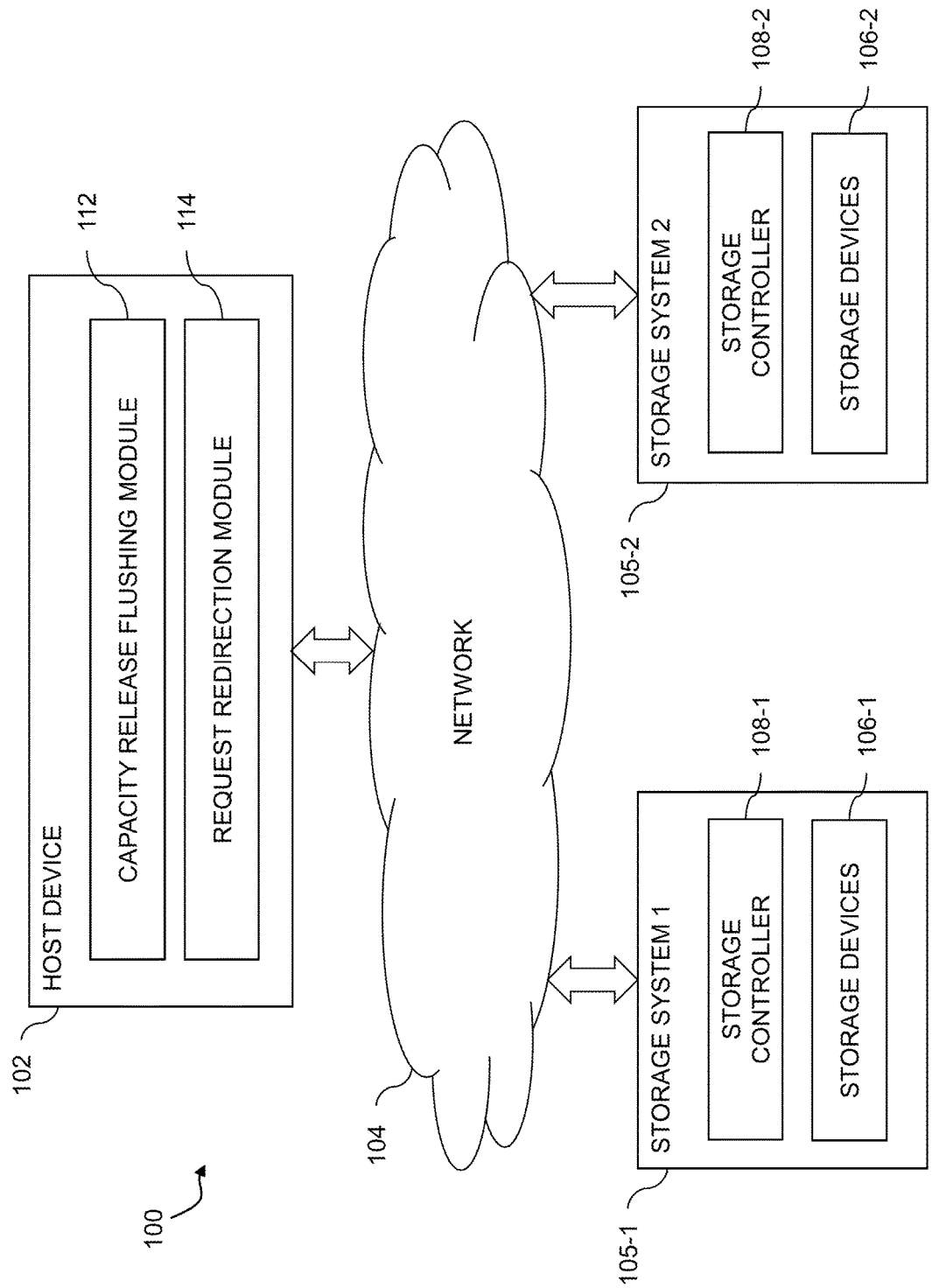
FIG. 1 is a block diagram of an information processing system comprising a host device configured with functionality for flushing and redirecting input-output requests during online cluster expansion in an illustrative embodiment.

FIG. 1 shows an information processing system 100 configured in accordance with an illustrative embodiment. The information processing system 100 comprises a host device 102, which may comprise one of a plurality of host devices of a computer system. The host device 102 communicates over a network 104 with first and second storage systems 105-1 and 105-2, also denoted as Storage System 1 and Storage System 2, respectively. The storage systems 105-1 and 105-2 are collectively referred to herein as storage systems 105. The host device 102 and storage systems 105 may be part of an enterprise computing and storage system, a cloud-based system or another type of system.

The host device 102 and storage systems 105 illustratively comprise respective processing devices of one or more processing platforms. For example, the host device 102 and the storage systems 105 can each comprise one or more processing devices each having a processor and a memory, possibly implementing virtual machines and/or containers, although numerous other configurations are possible.

The host device 102 and the storage systems 105 can additionally or alternatively be part of cloud infrastructure such as an Amazon Web Services (AWS) system. Other examples of cloud-based systems that can be used to provide one or more of host device 102 and storage systems 105 include Google Cloud Platform (GCP) and Microsoft Azure.

The host device 102 is configured to write data to and read data from the storage systems 105. The host device 102 and the storage systems 105 may be implemented on a common processing platform, or on separate processing platforms. A wide variety of other types of host devices can be used in other embodiments.

The host device 102 in some embodiments illustratively provides compute services such as execution of one or more applications on behalf of each of one or more users associated with the host device 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage systems 105 are accessible to the host device over the network 104. The storage system 105-1 comprises a plurality of storage devices 106-1 and an associated storage controller 108-1. Similarly, the storage system 105-2 comprises a plurality of storage devices 106-2 and an associated storage controller 108-2. The storage devices 106-1 and 106-2 are collectively referred to herein as storage devices 106. The storage controllers 108-1 and 108-2 are collectively referred to as storage controllers 108. In some embodiments, the storage systems 105 are assumed to provide at least a portion of a clustered storage system, where each of the storage systems 105 provides a storage node comprising a corresponding subset of storage devices 106 that collectively provide the clustered storage system. In other embodiments, storage system 105-1 and storage system 105-2 may be part of distinct clustered storage systems. One or both of the storage system 105-1 and 105-2 may be part of multiple distinct clustered storage systems, such as using different subsets or portions of its corresponding set of storage devices 106. Various other arrangements are possible.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, at least one of the storage systems 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement one or both of storage systems 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The host device 102 in the FIG. 1 embodiment includes a capacity release flushing module 112 and a request redirection module 114, which collectively provide logic and functionality for flushing and redirecting input-output (IO) requests during online cluster expansion (OCE). The modules 112 and 114 may provide functionality and logic for performing the process illustrated in the flow diagram of FIG. 3, described in further detail below. The host device 102 should also be understood to include additional modules and other components typically found in conventional implementations of computers, servers or other host devices, although such additional modules and other components are omitted from the figure for clarity and simplicity of illustration.

The host device 102 and storage systems 105 in the FIG. 1 embodiment are assumed to be implemented using at least one processing platform each comprising one or more processing devices each having a processor coupled to a memory. Such processing devices can illustratively include particular arrangements of compute, storage and network resources.

The host device 102 and the storage systems 105 may be implemented on respective distinct processing platforms, although numerous other arrangements are possible. For example, in some embodiments at least portions of the host device 102 and one or both of the storage systems 105 are implemented on the same processing platform. The storage systems 105 can therefore be implemented at least in part within at least one processing platform that implements at least a portion of the host device 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 102 and storage systems 105 to reside in different data centers. Numerous other distributed implementations of one or both of the host device 102 and the storage systems 105 are possible. Accordingly, the storage systems 105 can also be implemented in a distributed manner across multiple data centers.

Additional examples of processing platforms utilized to implement host devices and/or storage systems in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host device 102, network 104, storage systems 105, storage devices 106, and storage controllers 108 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing functionality for flushing and redirecting IO requests during OCE will be described below.

Figure 2:
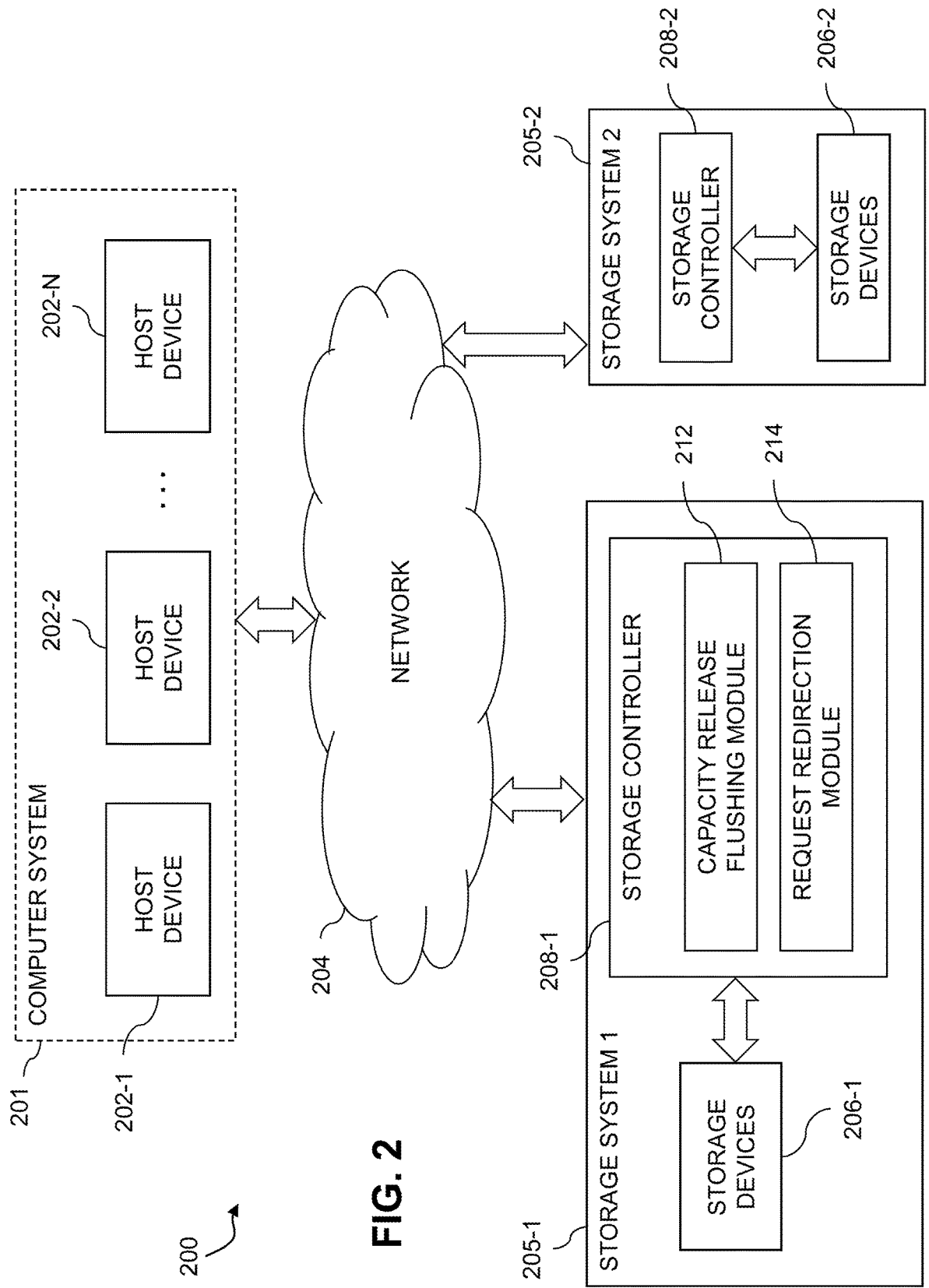
FIG. 2 is a block diagram of an information processing system comprising a storage system configured with functionality for flushing and redirecting input-output requests during online cluster expansion in an illustrative embodiment.

FIG. 2 shows an information processing system 200 configured in accordance with another illustrative embodiment. The information processing system 200 comprises a computer system 201 that includes host devices 202-1, 202-2, . . . 202-N. The host devices 202 communicate over a network 204 with first and second storage systems 205-1 and 205-2, also denoted as Storage System 1 and Storage System 2, respectively. The storage systems 205-1 and 205-2 are collectively referred to herein as storage systems 205. The computer system 201 is assumed to comprise an enterprise computer system, cloud-based computer system or other arrangement of multiple compute nodes associated with respective users. The host devices 202 of the computer system 201 in some embodiments illustratively provide compute services such as execution of one or more applications on behalf of each of one or more users associated with respective ones of the host devices 202.

Similar to the storage systems 105 of system 100, the storage systems 205 comprise respective storage devices 206-1 and 206-2 (collectively, storage devices 206) and respective storage controllers 208-1 and 208-2 (collectively, storage controllers 208). However, in this embodiment, the functionality for flushing and redirecting IO requests during OCE is implemented in the storage systems 205, rather than in one of the host devices 202. Accordingly, the storage controller 208-1 in this embodiment comprises modules 212 and 214, which are configured to operate in substantially the same manner as that described above for respective corresponding modules 112 and 114 of the host device 102 in the system 100. Although not shown in FIG. 2, the storage controller 208-2 of storage system 205-2 is assumed to similarly comprise modules 212 and 214 configured to operate in substantially the same manner as that described above for respective corresponding modules 112 and 114 of the host device 102 in the system 100.

In some embodiments, functionality for flushing and redirecting IO requests during OCE can be implemented partially in a host device and partially in a storage system, or may be distributed across multiple storage systems or storage nodes which collectively provide a clustered storage system. Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

The operation of the information processing systems 100 and 200 will now be described in further detail with reference to the flow diagram of the illustrative embodiment of FIG. 3. The process as shown includes steps 300 through 308, and is suitable for use in systems 100 and 200 but is more generally applicable to other types of information processing systems in which a host device or storage system is configured to perform capacity release flushing and IO request redirection during OCE.

Figure 3:
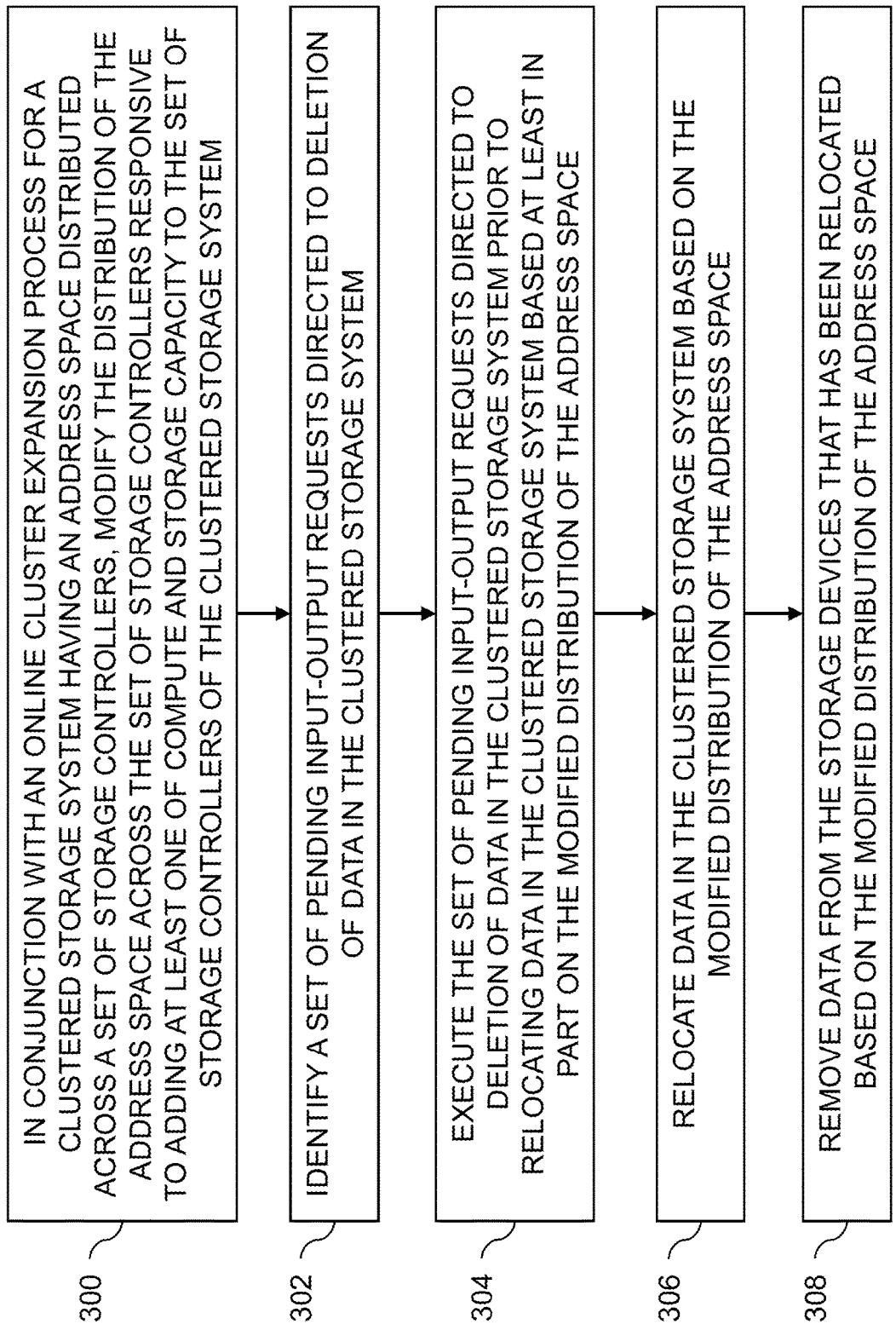
FIG. 3 is a flow diagram of a process for flushing and redirecting input-output requests during online cluster expansion in a storage system in an illustrative embodiment.

The FIG. 3 process is assumed to be performed in conjunction with an OCE for a clustered storage system that has an address space distributed across a set of storage controllers, with each storage controller having one or more associated storage devices. The clustered storage system may utilize content addressable storage (CAS). For example, the storage devices associated with the set of storage controllers of the clustered storage system may be configured to store user data pages and metadata pages. Each of the user data pages may have a logical address and a content-based signature derived from content of that user data page. Each of the metadata pages may characterize a plurality of the user data pages and associates the content-based signatures of those user data pages with respective physical blocks in the storage devices. In such an arrangement, the address space may be distributed across the set of storage controllers of the clustered storage system by allocating respective slices of the address space to ones of the set of storage controllers of the clustered storage system, where each slice comprises a set of the content-based signatures. In some embodiments, the set of storage controllers further decouple the release of logical addresses from the release of the physical blocks corresponding to the logical addresses (e.g., logical addresses may be released in a different order than the physical blocks corresponding to the logical addresses, and at different times).

The FIG. 3 process begins with step 300, modifying the distribution of the address space across the set of storage controllers. Step 300 is performed responsive to the cluster expansion, which may be a scale-out expansion (e.g., adding one or more additional storage controllers to the set of storage controllers of the clustered storage system), a scale-up expansion (e.g., adding one or more additional storage devices to one or more of the set of storage controllers of the clustered storage system), etc. More generally, step 300 is performed responsive to addition of at least one of compute and storage capacity to the set of storage controllers of the clustered storage system. In step 302, a set of pending IO requests directed to deletion of data in the clustered storage system is identified. For the above-described CAS implementation, step 302 may include identifying pending dereferencing operations for respective ones of the physical blocks corresponding to released logical addresses. The set of pending IO requests identified in step 302 are executed in step 304 prior to relocating data in the clustered storage system based at least in part on the modified distribution of the address space.

In step 306, data is relocated in the clustered storage system based at least in part on the modified distribution of the address space. Step 306 may include receiving, in a given one of the set of storage controllers, an IO request directed to data associated with a given content-based signature that is in a given portion of the address space allocated to the given storage controller in the modified distribution of the address space (e.g., whether the given storage controller is the "new" owner of a slice containing the given content-based signature after step 300). A determination is then made as to whether the given content-based signature was in a portion of the address space allocated to the given storage controller prior to modifying the distribution of the address space (e.g., whether the given storage controller was the "old" owner of a slice containing the given content-based signature prior to step 300).

If the given content-based signature was in the portion of the address space allocated to the given storage controller prior to modifying the distribution of the address space in step 300, the given storage controller updates metadata associating the content-based signature with one or more physical blocks in one or more of the storage devices associated with the given storage controller in accordance with the given IO request. If the given content-based signature was not in the portion of the address space allocated to the given storage controller prior to modifying the distribution of the address space in step 300, the given storage controller determines whether data associated with the given content-based signature has already been relocated from one or more storage devices associated with another one of the set of storage controllers to one or more of the storage devices associated with the given storage controller. If the data associated with the given content-based signature has already been relocated, then the given storage controller will update metadata associating the content-based signature with one or more physical blocks in one or more of the storage devices associated with the given storage controller in accordance with the given IO request. If the data associated with the given content-based signature has not already been relocated, the given storage controller sends a request to the other storage controller to update metadata associating the content-based signature with one or more physical blocks in the storage devices associated with the other storage controller in accordance with the given IO request.

The FIG. 3 process continues with step 308, removing data from the storage devices in the clustered storage system that has been relocated in step 306. This may involve, for example, deleting or releasing physical blocks in a storage device where the data of such physical blocks has been relocated to a new storage device in another storage controller, or to another storage device associated with a same storage controller.

As described above, it is desired for storage systems to have mechanisms for handling OCE while continuing to serve IO requests. Storage systems may perform OCE though cluster capacity increases that are achieved through the addition of storage controllers and associated storage devices (e.g., capacity) to the storage system, or through addition of storage devices (e.g., capacity) to an existing storage controller. It is also desirable for storage systems, including CAS, to provide for decoupling of "logical" and "physical" deletion or release. Through decoupling logical and physical deletion, performance may be optimized. For example, a foreground process may be used to achieve logical deletion or capacity release in a logical metadata layer, where the logical metadata layer maps logical addresses to keys (e.g., hashes). A background process may be used to achieve physical deletion in a physical metadata layer, where the physical metadata layer maps the keys or hashes to physical locations on storage devices (e.g., physical data locations on flash or other storage devices).

By decoupling logical and physical deletion or capacity release, storage system performance may be optimized. For example, the logical address space may be released in a first order, with the physical address space being released in a second, different order. The logical address space may be released or made available immediately, while corresponding physical blocks are released in a different order through accumulation and reordered execution of dereferencing operations. When logical capacity deletion or release is decoupled from physical capacity deletion or release, logical and physical capacity deletion or release processes can be carried out in respective different orders each best suited for its corresponding capacity type thereby avoiding inefficiencies of conventional tightly coupled arrangements. Additional details regarding decoupling of logical and physical capacity deletion or release are provided below in the discussion of FIG. 5.

Enabling OCE with decoupled logical and physical capacity deletion or release, however, provides a number of challenges. OCE provides methods for increasing the capacity and computing resources of a clustered storage system. Scale-out OCE involves introducing additional storage controllers to the clustered storage system. The additional storage controllers provide increased storage capacity (e.g., through associated additional storage devices associated with such additional storage controllers) as well as additional compute capacity provided by the additional storage controllers themselves. Scale-up OCE involves introduction of additional storage capacity (e.g., additional storage devices, replacing existing storage devices with new storage devices having higher capacity, etc.) to existing storage controllers. One challenge of OCE in clustered storage systems is in maintaining data correctness while serving IO requests while the data is migrating to its new "owner" (e.g., a new or different storage controller) as part of the cluster expansion process.

In CAS architectures, distribution of "slices" (e.g., collections of hashes or keys and associated addresses) is done between storage controllers to best utilize compute and storage capacity. Due to the CAS architecture, this distribution in turn balances the workload between storage controllers. During scale-out or scale-up OCE, however, the additional storage and/or compute capacity provided by additional storage controllers or the additional storage and/or compute capacity added to existing storage controllers may result in disrupting the balance of slices between the storage controllers (e.g., between a new storage controller being introduced and existing storage controllers in the clustered storage system). This is particularly an issue during so-called "asymmetric" OCE.

OCE may be symmetric or asymmetric. Symmetric OCE involves adding storage capacity equally across the storage controllers or nodes in the clustered storage system. This may involve, for example, adding a new storage device with the same storage capacity to each existing storage controller, adding an additional storage controller and associated storage devices with the same storage and compute capacity as existing storage controllers, adding compute capacity to each existing storage controller, combinations thereof, etc. Asymmetric OCE involves adding storage or compute capacity to a subset but not all of the storage controllers or nodes in the clustered storage system.

In CAS architectures, as noted above, the hash or address space may be distributed as slices across the storage controllers or nodes of the clustered storage system. In some embodiments, a "perfect" division of the address space is desired (e.g., where each storage node or storage controller has an equal portion of the address space). In other embodiments, different balanced division of the address space may be desired (e.g., division of the address space in proportion to compute and/or storage capacity of the storage controllers in the clustered storage system, etc.).

To overcome issues related to unbalanced distribution of slices across the storage controllers of the clustered storage system, an OCE process can redistribute slices between the storage controllers to maintain a desired balance (e.g., equal distribution across the storage controllers, distribution proportional to compute and/or storage capacity across the storage controllers, etc.). After redistribution of the slices, there may be a period of time in which a storage controller may "own" a particular slice, but where the data for that slice resides on a different storage controller (e.g., the old "owner" of that slice). When logical and physical deletion or release is decoupled, a storage controller may seek to delete a key or hash that is no longer owned by that storage controller (e.g., such as in a case where the physical deletion was prior to or during the OCE process and the logical deletion is during or after the OCE process). Illustrative embodiments provide techniques for enabling physical and logical deletion separation, even while an OCE is in process.

As noted above, in a CAS storage array of a clustered storage system, such as an XtremIO™ storage array, data may be saved in two separate layers, a logical metadata layer and a physical metadata layer. The logical metadata layers maps logical addresses to keys (e.g., hash signatures), while the physical metadata layer maps the keys or hashes to physical data locations on the storage devices of the storage array. Logical data may be organized by logical block addresses (LBAs), which have reference to an appropriate key corresponding to the data. Each key in the physical metadata layer is saved along with an associated reference count (e.g., the number of logical blocks pointing to a particular physical block) and the data location on a storage device (e.g., a flash device such as a SSD).

The OCE process may be divided into several steps or phases. In a first step or phase, slice redistribution is performed. During the slice redistribution phase, slices (e.g., collections of hashes) are distributed between existing and any additional storage controllers. In a second step or phase, data relocation is performed. During the data relocation phase, data is physically moved from old slice owners to new slice owners, where the storage controllers are the slice owners. The data relocation phase may take a relatively long time (e.g., hours, days, etc.), particularly as the size of storage clusters increase. In a third step or phase, data removal is performed. During the data removal phase, data stored on the old slice owners is deleted. The data removal phase is performed under control of the new slice owners. The data removal phase may proceed in accordance with ordered buckets of hashes.

When the separation of logical and physical capacity deletion or release is implemented, the above-described OCE processes faces a number of potential issues. One potential issue is that a portion of the physical capacity (e.g., a hash) may have had its logical capacity deleted or released prior to the slice redistribution phase while its physical capacity release or deletion is yet to be performed, and where the slice to which that hash belongs was moved to a new storage controller as part of the slice redistribution phase. Deleting such a hash or portion of the physical capacity is challenging, as the old slice owner is not the current owner of the hash. This may result in so-called "leaks" where the data never gets deleted (e.g., the physical capacity corresponding to the hash is not released) when the OCE process has already moved the hash to its new owner during the slice redistribution phase. This may also result in "hash not found" or HNF errors where the OCE process has already removed the hash from the old owner. The HNF error may result in repeated attempts to delete a hash that is already deleted.

Another potential issue is that a portion of the physical capacity (e.g., a hash) may have had its logical capacity deleted or released after the OCE process started, and where the slice to which that hash belongs was moved to a new storage controller during the slice redistribution phase. This may result in a HNF error where the new slice owner attempts to delete or release the hash, but where the underlying data relocation of the hash has not yet been performed.

To address these and other issues, illustrative embodiments implement a flush mechanism during the OCE process. More particular, a flush step or phase is implemented after the slice redistribution phase and before the data relocation phase. During the flush phase, all physical capacity deletion requests received prior to the slice redistribution are executed or flushed. This is done to make sure that once the data relocation or data removal starts, old slice owners will not hold any hashes (e.g., by the physical-logical decoupling mechanism) belonging to a new slice owner. The flush mechanism guarantees that physical capacity deletion or release is done solely by the new slice owner during the data relocation and data removal phases of the OCE process. Only when the flush phase is completed across all the storage controllers in the clustered storage system does the OCE process continue to the data relocation phase. In other words, during the flush phase no actual data movement is performed.

In order to handle IO requests for new slices that a storage controller owns, but for which the hashes have not yet been relocated to the storage controller (e.g., hashes that still reside on the storage controller of the old slice owner), illustrative embodiments introduce an IO redirect mechanism to allow the new slice owner to request the old slice owner of the hash to perform a requested IO operation. The IO redirect mechanism may be implemented for any IO operation handled by the storage controller. IO redirection in some embodiments is synchronized to the data relocation process or phase, as there is a need to maintain atomicity of operations in the new or old slice owner.

To delete a hash that has already been relocated from the old slice owner to the new slice owner, the IO redirect mechanism performs the hash deletion locally by the new slice owner. This overcomes the above-noted "leak" issue. As the IO redirect mechanism guarantees that no hash to be deleted resides in the old slice owner, the HNF error is overcome in instances where the physical capacity or hash is deleted prior to the OCE process. The IO redirect mechanism further overcomes the HNF error in instances where a hash is deleted and has not yet been relocated from the old slice owner to the new slice owner. This issue is overcome as the IO redirect mechanism requests the hash deletion to performed by the old slice owner. The IO redirect mechanism is synchronized with the data relocation process to achieve this.

Figure 4:
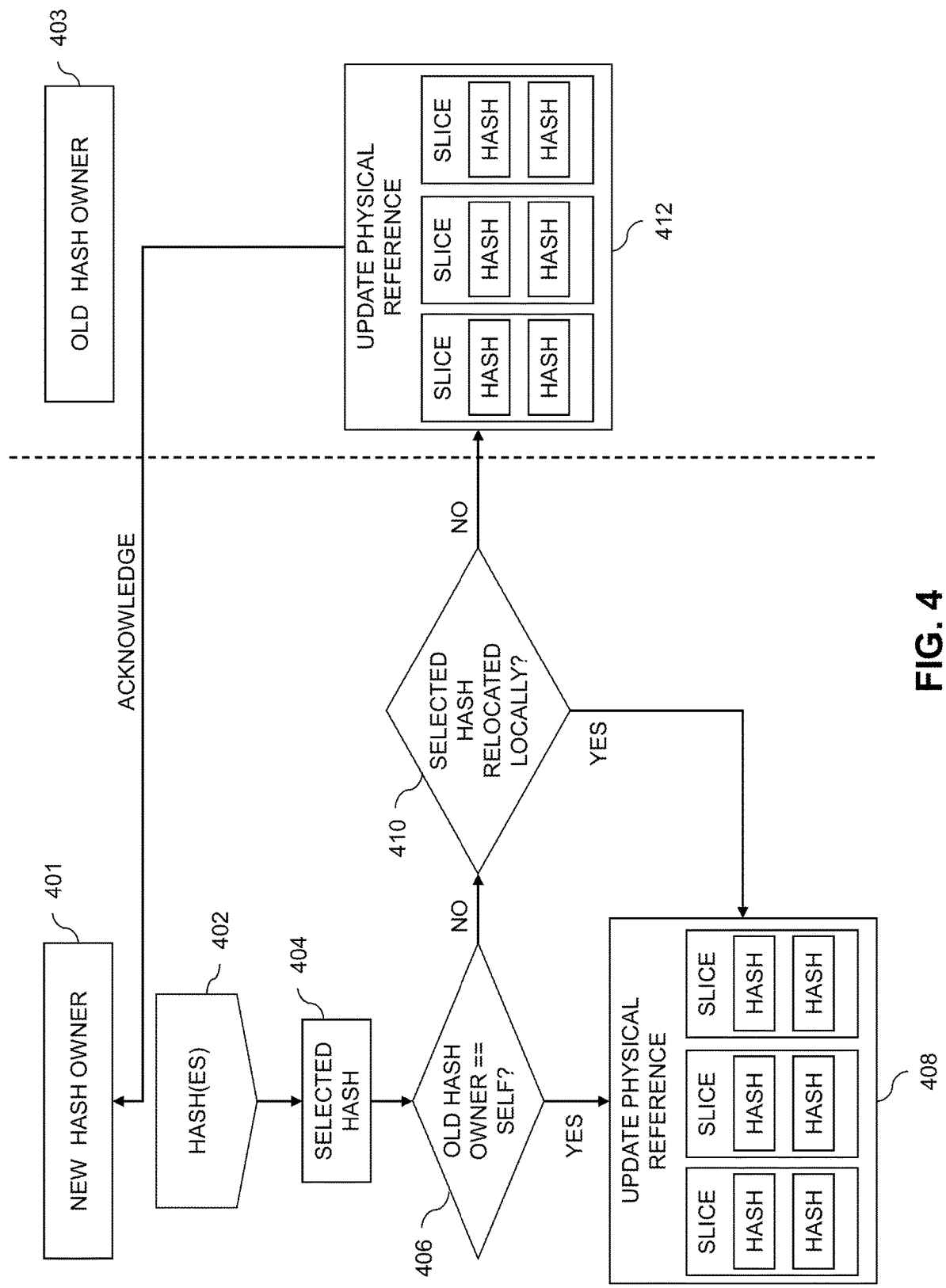
FIG. 4 is a flow diagram of a process for redirecting input-output requests during online cluster expansion in an illustrative embodiment.

FIG. 4 illustrates an implementation of the IO redirect mechanism. FIG. 4 shows actions taken by the "new" hash owner 401 and "old" hash owner 403 on opposite sides of the dashed vertical line. The new hash owner 401 represents the storage controller to which a slice including a hash of interest has been redistributed as part of the slice redistribution phase of the OCE process. The old hash owner 403 represents the storage controller from which the slice including the hash of interest has been redistributed as part of the slice redistribution phase of the OCE process. In step 404, one of a set of hashes 402 is selected for deletion or capacity release. In step 406, the new hash owner 401 determines whether the old hash owner for the selected hash 404 (e.g., the owner prior to the slice redistribution phase of the OCE process) is itself. If the new hash owner 401 is the old hash owner, the new hash owner 401 proceeds to update the physical reference 408 in the physical metadata layer for the selected hash 404.

If the new hash owner 401 is not the old hash owner for the selected hash 404, the process proceeds with step 410 to determine whether the selected hash 404 has already been relocated locally to the new hash owner 401 as part of the data relocation phase of the OCE process. If the selected hash 404 has already been relocated locally to the new hash owner 401, the process proceeds with the new hash owner 401 updating the physical reference in step 408. When the selected hash 404 has not yet been relocated locally to the new hash owner 401 as part of the data relocation phase of the OCE process, the new hash owner 401 sends a request to the old hash owner 403 to delete or release the selected hash. The old hash owner 403 updates the physical reference in step 412, then sends an acknowledgement back to the new hash owner 401.

Illustrative embodiments of content addressable storage systems or other types of storage systems with functionality for flushing and redirecting IO requests during an OCE process as disclosed herein can provide a number of significant advantages relative to conventional arrangements.

For example, approaches that tightly couple logical and physical capacity during cluster expansion are problematic in terms of storage system performance at the capacity removal time. Further, such systems are inefficient in that they typically handle the same reference multiple times, and exhibit decreased amortization due to unsorted removal of references.

As another example, approaches that delete logical capacity during cluster expansion and utilize a background process to search for and delete unused physical capacity after the cluster expansion process is complete are problematic in that such approaches require scanning of all physical blocks to determine whether they are in use (e.g., whether they can be deleted or released). This garbage collection process requires scanning of the whole physical space and logical space to verify that no references point to the physical blocks. Thus, such approaches are costly and lead to host IO performance degradation.

Illustrative embodiments overcome these and other disadvantages, in providing techniques which permit OCE to handle IO requests while maintaining the benefits of decoupled logical and physical capacity deletion or release. Such benefits are maintained during the OCE process, and during capacity ownership traversal across the clustered storage system. Further, some embodiments permit the work of physical capacity removal to be smoothed over a long period even during the OCE process. Some embodiments also provide improved amortization by ordering work to match the physical layout of metadata during the OCE process.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

In some embodiments, the storage system comprises an XtremIO™ storage array or other type of content addressable storage system suitably modified to incorporate functionality for flushing and redirecting IO requests during OCE as disclosed herein.

An illustrative embodiment of such a content addressable storage system will now be described with reference to FIG. 5. In this embodiment, a content addressable storage system 505 comprises a plurality of storage devices 506 and an associated storage controller 508. The content addressable storage system 505 may be viewed as a particular implementation of the storage system 205, and accordingly is assumed to be coupled to host devices 202 of computer system 201 via network 204 within information processing system 200.

The storage controller 508 in the present embodiment is configured to implement functionality for flushing and redirecting IO requests during OCE of the type previously described in conjunction with FIGS. 1-4.

The storage controller 508 includes distributed modules 512 and 514, which are configured to operate in a manner similar to that described above for respective corresponding modules 112, 212 and 114, 214.

Figure 5:
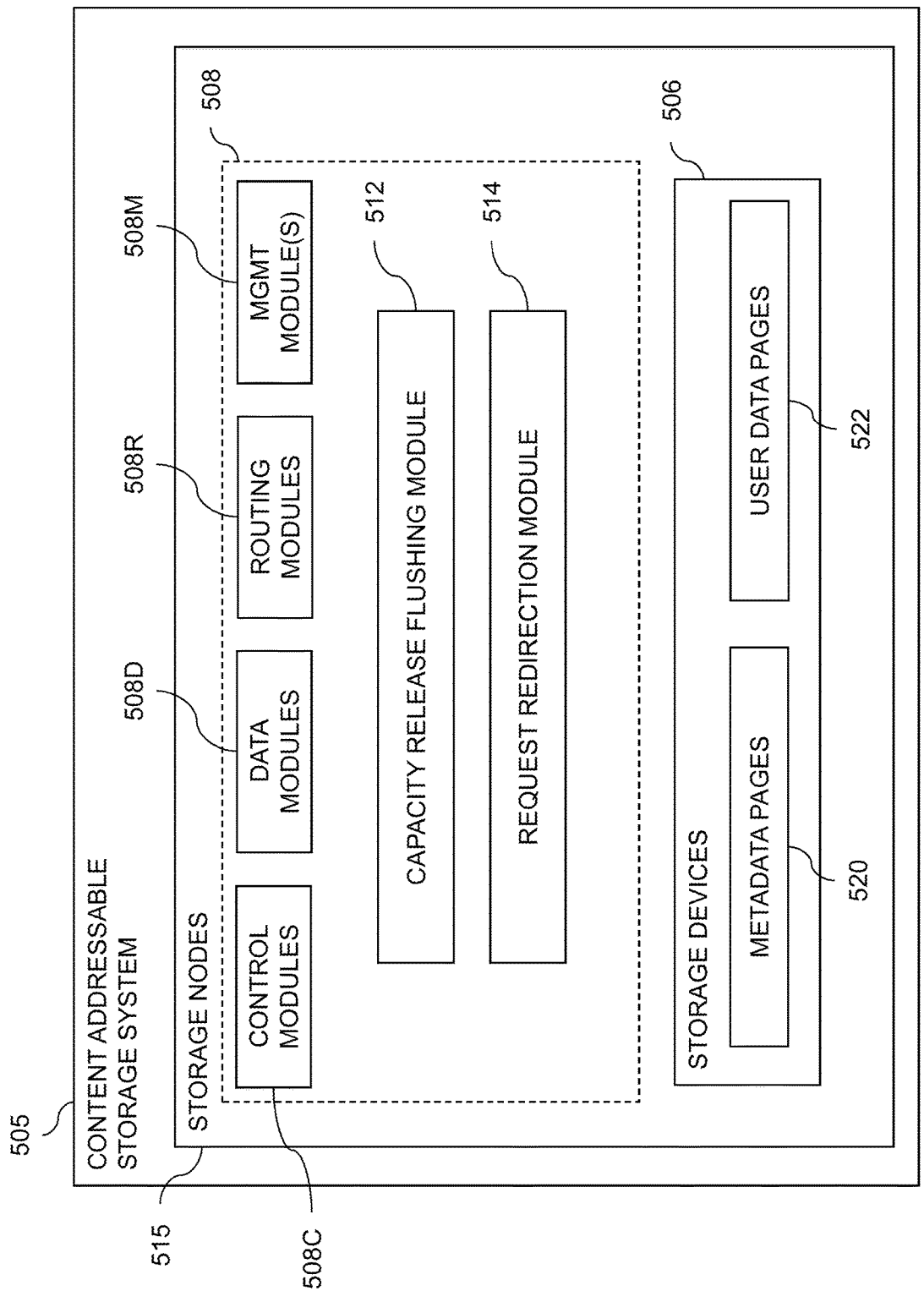
FIG. 5 shows a content addressable storage system having a distributed storage controller configured with functionality for flushing and redirecting input-output requests during online cluster expansion in an illustrative embodiment.

The content addressable storage system 505 in the FIG. 5 embodiment is implemented as at least a portion of a clustered storage system and includes a plurality of storage nodes 515 each comprising a corresponding subset of the storage devices 506. Other clustered storage system arrangements comprising multiple storage nodes can be used in other embodiments. A given clustered storage system may include not only storage nodes 515 but also additional storage nodes coupled to network 204. Alternatively, such additional storage nodes may be part of another clustered storage system of the system 200. Each of the storage nodes 515 of the storage system 505 is assumed to be implemented using at least one processing device comprising a processor coupled to a memory.

The storage controller 508 of the content addressable storage system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 may be more particularly referred to as a distributed storage controller.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the content addressable storage system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515.

Each of the storage nodes 515 of the storage system 505 therefore comprises a set of processing modules configured to communicate over one or more networks with corresponding sets of processing modules on other ones of the storage nodes. A given such set of processing modules implemented on a particular storage node illustratively includes at least one control module 508C, at least one data module 508D and at least one routing module 508R, and possibly a management module 508M. These sets of processing modules of the storage nodes collectively comprise at least a portion of the distributed storage controller 508.

Communication links may be established between the various processing modules of the distributed storage controller 508 using well-known communication protocols such as IP, Transmission Control Protocol (TCP), and remote direct memory access (RDMA). For example, respective sets of IP links used in data transfer and corresponding messaging could be associated with respective different ones of the routing modules 508R.

Although shown as separate modules of the distributed storage controller 508, the modules 512 and 514 in the present embodiment are assumed to be distributed at least in part over at least a subset of the other modules 508C, 508D, 508R and 508M of the storage controller 508. Accordingly, at least portions of the functionality of the modules 512 and 514 may be implemented in one or more of the other modules of the storage controller 508. In other embodiments, the modules 512 and 514 may be implemented as stand-alone modules of the storage controller 508.

The storage devices 506 are configured to store metadata pages 520 and user data pages 522, and may also store additional information not explicitly shown such as checkpoints and write journals. The metadata pages 520 and the user data pages 522 are illustratively stored in respective designated metadata and user data areas of the storage devices 506. Accordingly, metadata pages 520 and user data pages 522 may be viewed as corresponding to respective designated metadata and user data areas of the storage devices 506.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 520 and the user data pages 522.

The user data pages 522 are part of a plurality of logical units (LUNs) configured to store files, blocks, objects or other arrangements of data, each also generally referred to herein as a "data item," on behalf of users associated with host devices 202. Each such LUN may comprise particular ones of the above-noted pages of the user data area. The user data stored in the user data pages 522 can include any type of user data that may be utilized in the system 200. The term "user data" herein is therefore also intended to be broadly construed.

The content addressable storage system 505 in the embodiment of FIG. 5 is configured to generate hash metadata providing a mapping between content-based digests of respective ones of the user data pages 522 and corresponding physical locations of those pages in the user data area. Content-based digests generated using hash functions are also referred to herein as "hash digests." The hash metadata generated by the content addressable storage system 505 is illustratively stored as metadata pages 520 in the metadata area. The generation and storage of the hash metadata is assumed to be performed under the control of the storage controller 508.

Each of the metadata pages 520 characterizes a plurality of the user data pages 522. For example, a given set of user data pages representing a portion of the user data pages 522 illustratively comprises a plurality of user data pages denoted User Data Page 1, User Data Page 2, . . . User Data Page n. It should be noted that usage of the variable n in this user data page context is unrelated to its usage elsewhere herein.

Each of the user data pages 522 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 506.

Each of the metadata pages 520 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 520 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 505 is illustratively distributed among the control modules 508C. The management module 508M may include a capacity release engine, or other arrangement of capacity release control logic that engages corresponding capacity release control logic instances in all of the control modules 508C and routing modules 508R in order to implement decoupled logical and physical capacity release and deletion as described herein. In some embodiments, it is desirable to implement the functionality for decoupling logical and physical capacity release and deletion across multiple distributed processing modules, such as the processing modules 508C, 508D, 508R and 508M of the distributed storage controller 508.

The functionality provided by modules 512 and 514 in this embodiment is assumed to be distributed across multiple distributed processing modules, including at least a subset of the processing modules 508C, 508D, 508R and 508M of the distributed storage controller 508.

For example, the management module 508M of the storage controller 508 may include logic that engages corresponding logic instances in all of the control modules 508C and routing modules 508R in order to implement processes for flushing and redirecting IO requests during OCE.

In some embodiments, the content addressable storage system 505 comprises an XtremIO™ storage array suitably modified to incorporate techniques for flushing and redirecting IO requests during OCE as disclosed herein.

In arrangements of this type, the control modules 508C, data modules 508D and routing modules 508R of the distributed storage controller 508 illustratively comprise respective C-modules, D-modules and R-modules of the XtremIO™ storage array. The one or more management modules 508M of the distributed storage controller 508 in such arrangements illustratively comprise a system-wide management module ("SYM module") of the XtremIO™ storage array, although other types and arrangements of system-wide management modules can be used in other embodiments. Accordingly, functionality for flushing and redirecting IO requests during OCE in some embodiments is implemented under the control of at least one system-wide management module of the distributed storage controller 508, utilizing the C-modules, D-modules and R-modules of the XtremIO™ storage array. In this context, the distributed storage controller 508 may act as the "set of storage controllers," with individual C-modules acting as respective ones of the set of storage controllers.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules (e.g., where the C-modules represent respective ones of the "set of storage controllers" across which the address space or slices are distributed). For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 508C such that control of the slices within the storage controller 508 of the storage system 505 is substantially evenly distributed over the control modules 508C of the storage controller 508.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 505 each illustratively comprise one or more IO operations directing that at least one data item of the storage system 505 be written to in a particular manner. A given write request is illustratively received in the storage system 505 from a host device, illustratively one of the host devices 202. In some embodiments, a write request is received in the distributed storage controller 508 of the storage system 505, and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 515 communicate with one another over a high-speed internal network such as an InfiniBand network. The C-modules, D-modules and R-modules coordinate with one another to accomplish various IO processing tasks.

The manner in which decoupled logical and physical capacity release and deletion may be provided will now be described with respect to the FIG. 5 embodiment. The process is assumed to be carried out by the processing modules 508C, 508D, 508R and 508M. It is further assumed that the control modules 508C write data pages in the content addressable storage system 505 via the data modules 508D in accordance with write requests received from host devices via the routing modules 508R.

The write requests from the host devices identify particular data pages to be written in the storage system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 505 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 505.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 506. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 505 correspond to respective physical blocks of a physical layer of the storage system 505. The user data pages of the logical layer are organized by LBA and have reference via respective content-based signatures to particular physical blocks of the physical layer.

Each of the physical blocks has an associated reference count that is maintained within the storage system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

Execution of a given write request received in the storage system 505 from a host device 202 illustratively involves the following operations:

1. Receive the write request in a particular control module 508C from a particular routing module 508R.

2. Acquire CIO address range lock for the logical address range to be written, where CIO refers to an IO process component in the control module 508C. As noted above, the control modules have ownership of particular logical address spaces, and the CIO address therefore denotes a global logical address for a given storage block.

3. Perform a read-modify operation if the write is a small or unaligned write. Examples of read-modify operations for use with small or unaligned writes can be found in U.S. Pat. No. 9,104,326, entitled "Scalable Block Data Storage Using Content Addressing," which is incorporated by reference herein.

4. Write the data pages to a data module 508D, based on a hash-to-data ("H2D") table. New hash handles are generated for the respective data pages, and reference counts associated with the new hash handles are incremented.

5. Release the CIO address range lock.

6. Send a response back to the requesting routing module 508R.

7. Decrement reference counts associated with the old hash handles of respective data pages that have been overwritten. These are examples of what are more generally referred to herein as "dereferencing operations."

In conjunction with release of logical address space in the storage system 505, the storage controller 508 makes the released logical address space available to users in a first order based at least in part on released logical address, accumulates multiple dereferencing operations for respective ones of the physical blocks corresponding to the released logical address space, and executes the accumulated dereferencing operations for the physical blocks in a second order that differs from the first order.

The logical address space illustratively comprises one or more ranges of LBAs each comprising a LUN ID and an offset. For example, each LBA can identify a particular one of the user data pages 522. The LBAs each correspond to one or more physical blocks in the storage devices 506. Other types of LBAs and logical address spaces can be used in other embodiments. The term "logical address" as used herein is therefore intended to be broadly construed.

A given such logical address space may be released responsive to deletion of a corresponding storage volume, snapshot or any other arrangement of data stored in the storage system 505. As described above, such deletion may occur during redistribution or other movement of data between storage devices or storage controllers during an OCE process. Other conditions within the storage system 505 can also result in release of logical address space.

The storage controller 508 makes the released logical address space available to users in a first order, such as by making the released logical address space available to users in order of released logical address. More particularly, the storage controller 508 can make the released logical address space available to users in order of released logical address by making each of its corresponding released logical addresses immediately available responsive to that logical address being released. For example, release of one or more LBAs or a range of LBAs by one or more users can result in those LBAs being made available to one or more other users in the same order in which the LBAs are released. However, the corresponding physical blocks are released in a different order, through accumulation and reordered execution of dereferencing operations as will be described below.

The storage controller 508 in some embodiments accumulates multiple dereferencing operations for each of at least a subset of the metadata pages 520, and executes the accumulated dereferencing operations for a given one of the metadata pages 520 responsive to the accumulated dereferencing operations for the given metadata page reaching a threshold number of dereferencing operations.

The storage controller 508 may be configured to adjust the threshold number of dereferencing operations over time based at least in part on variations in IO processing load of the storage system 505. For example, the threshold number of dereferencing operations may be selected so as to achieve a target dereferencing amortization rate for one or more of the metadata pages 520. Also, different threshold numbers may be selected for different ones of the metadata pages 520. For example, it may be desirable to establish different threshold numbers for different types of metadata pages in order to achieve different target dereferencing amortization rates for the different types of metadata pages. A given target dereferencing amortization rate illustratively provides release of physical blocks at a rate sufficient to satisfy physical block demand of user IO processing requirements in storage system 505.

In some embodiments, accumulating multiple dereferencing operations for respective ones of the physical blocks corresponding to the released logical address space further comprises aggregating the multiple dereferencing operations into additional pages of a particular data type, and writing the additional pages to a persistent memory of the storage system 505. Such a persistent memory may comprise, for example, a designated portion of one or more of the storage devices 506.

Execution of the accumulated dereferencing operations for the physical blocks illustratively comprises retrieving the additional pages from the persistent memory, determining if the additional pages include at least a threshold number of dereferencing operations for each of one or more of the metadata pages 520, and executing the dereferencing operations for any of the metadata pages having at least the threshold number of dereferencing operations. Again, different threshold numbers can be established within the storage system 505 for respective different types of metadata pages.

In executing the accumulated dereferencing operations for the physical blocks, execution of each of the dereferencing operations more particularly involves decrementing a reference count of a corresponding one of the physical blocks, and releasing the physical block responsive to the reference count reaching a designated number, such as zero. Moreover, in executing the accumulated dereferencing operations for the physical blocks, at least a subset of the accumulated dereferencing operations are first reordered into an order that more closely matches a physical layout of the corresponding physical blocks on the storage devices 506. The reordered dereferencing operations are then executed in that order.

As a result, the physical blocks are released in the storage system 505 in a different order than that in which their corresponding logical blocks are released. This provides a number of significant advantages.

For example, decoupling and reordering of logical and physical capacity release is advantageously configured to provide highly efficient release of both logical and physical capacity in the storage system. This is achieved in some embodiments by decoupling logical capacity release from physical capacity release in a manner that permits logical and physical capacity release to be carried out in respective different orders each better suited to its corresponding capacity type, thereby avoiding the inefficiencies of conventional tightly coupled arrangements. Storage system performance is therefore significantly improved.

When release of logical capacity is tightly coupled with release of corresponding physical capacity, system performance can be negatively affected. For example, a given logical block and its corresponding physical block may be released substantially simultaneously by executing the dereferencing operation to decrement the physical block reference count in conjunction with release of the given logical block. If the dereferencing operation results in a reference count of zero, the physical block can be immediately released, substantially contemporaneously with the release of the corresponding logical block. However, this approach creates inefficiencies that can significantly undermine system performance. For example, simultaneous deletion of a large number of storage volumes can cause massive amounts of logical and physical capacity release, necessitating excessive consumption of system resources for updating of metadata pages and resulting in a corresponding significant degradation in IO processing throughput.

Systems with tight coupling of logical and physical capacity release also fail to recognize that physical blocks are typically ordered in a substantially different manner than logical blocks within a storage system. Dereferencing physical blocks in the same order in which the logical blocks are released results in suboptimal processing within the storage system, and fails to adapt the release of physical capacity to the particular manner in which the physical blocks are organized.

By decoupling and reordering logical and physical capacity release and deletion, systems are configured to avoid these and other problems. Embodiments further provide techniques for enabling OCE while maintaining the benefits of such decoupled logical and physical capacity release or deletion.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement functionality for flushing and redirecting IO requests during OCE in a clustered storage system in other embodiments.

Additional examples of content addressable storage functionality implemented in some embodiments by control modules 508C, data modules 508D, routing modules 508R and management module(s) 508M of distributed storage controller 508 can be found in the above-cited U.S. Pat. No. 9,104,326, which is incorporated by reference herein. Alternative arrangements of these and other storage node processing modules of a distributed storage controller in a content addressable storage system can be used in other embodiments.

Illustrative embodiments of processing platforms utilized to implement host devices and storage systems with functionality for flushing and redirecting IO requests during OCE will now be described in greater detail with reference to FIGS. 6 and 7. Although described in the context of system 100, these platforms may also be used to implement at least portions of other information processing systems in other embodiments.

Figure 6:
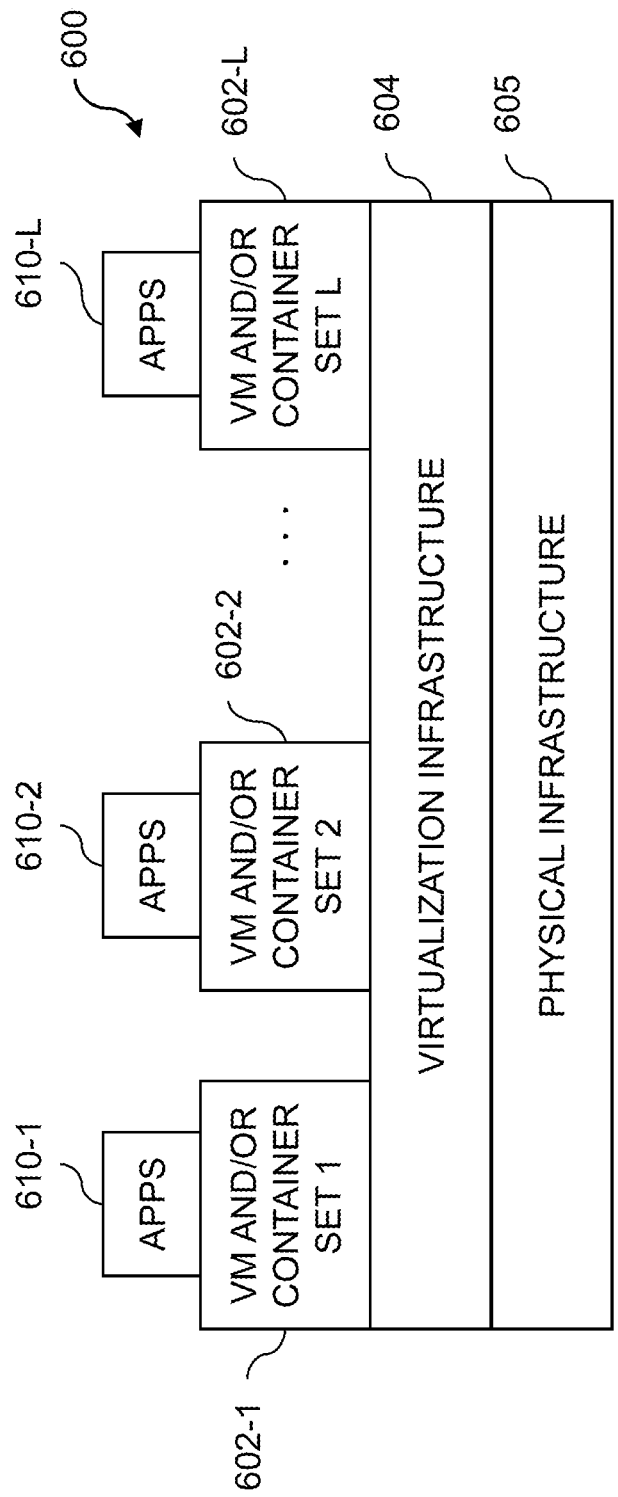
FIGS. 6 and 7 show examples of processing platforms that may be utilized to implement at least a portion of an information processing system in illustrative embodiments.
Figure 7:
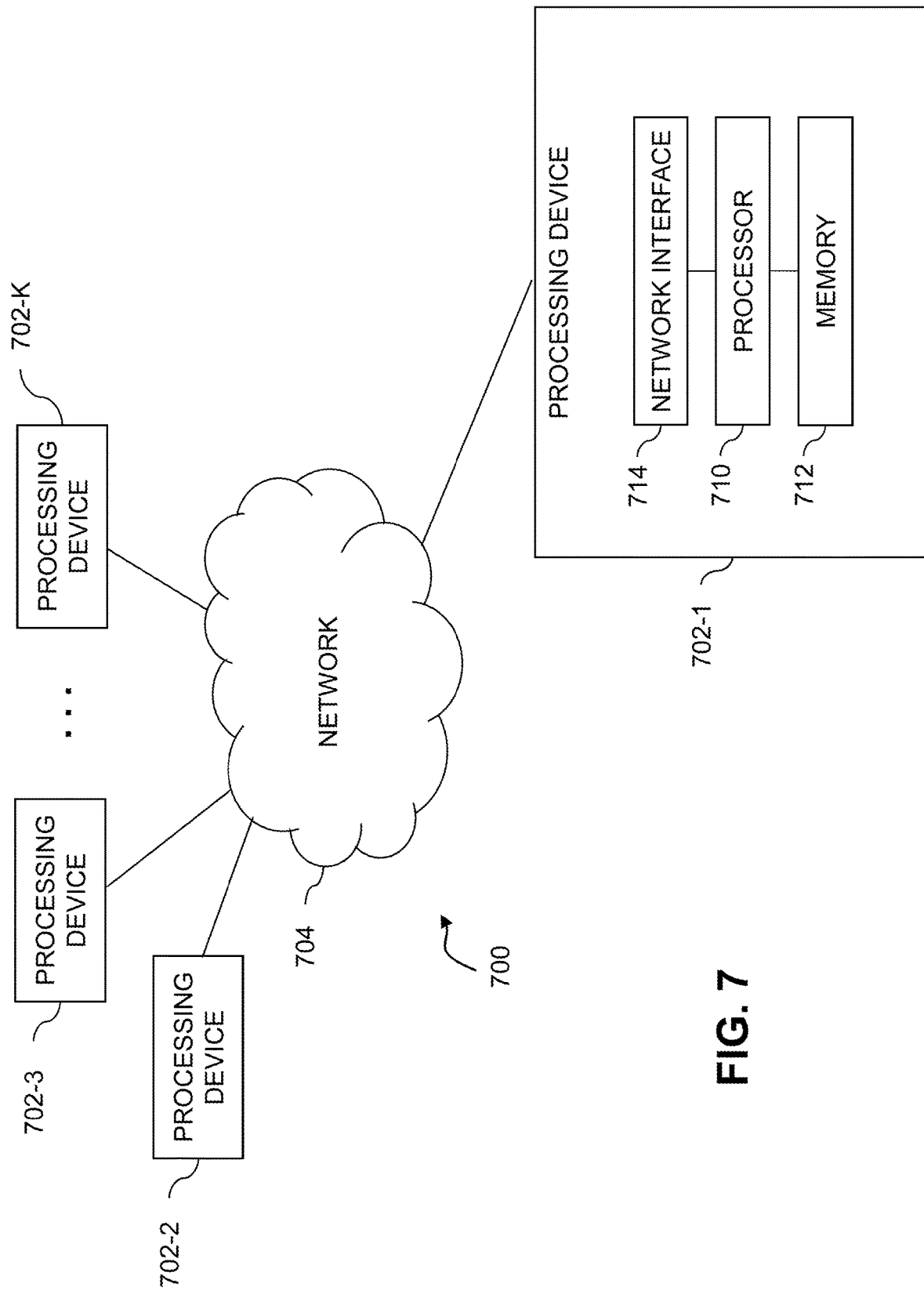

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for flushing and redirecting IO requests during OCE of the type described above for one or more processes running on a given one of the VMs. For example, each of the VMs can implement such functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide functionality for flushing and redirecting IO requests during OCE of the type described above for one or more processes running on different ones of the containers. For example, a container host device supporting multiple containers of one or more container sets can implement one or more instances of such functionality or logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 or 200 may include additional or alternative processing platforms, as well as numerous distinct processing platforms in any combination, with each such platform comprising one or more computers, servers, storage devices or other processing devices. For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for flushing and redirecting IO requests during OCE as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage nodes, storage devices, storage controllers, processing modules, capacity release flushing and request redirection logic, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured, in conjunction with an online cluster expansion process for a clustered storage system having an address space distributed across a set of storage controllers each associated with one or more storage devices:
      to modify the distribution of the address space across the set of storage controllers responsive to adding at least one of compute and storage capacity to the set of storage controllers of the clustered storage system;
      to identify a set of pending input-output requests directed to deletion of data in the clustered storage system;
      to execute the set of pending input-output requests directed to deletion of data in the clustered storage system prior to relocating data in the clustered storage system based at least in part on the modified distribution of the address space;
      to receive, at a given one of the set of storage controllers, a given input-output request directed to data associated with a given content-based signature that is in a given portion of the address space allocated to the given storage controller in the modified distribution of the address space; and
      to modify a manner in which the given input-output request is processed at the given storage controller based at least in part on whether the given content-based signature was in a portion of the address space allocated to the given storage controller prior to the modification of the distribution of the address space.

2. The apparatus of claim 1 wherein the storage devices associated with the set of storage controllers of the clustered storage system are configured to store user data pages and metadata pages, each of the user data pages having a logical address and a content-based signature derived from content of that user data page, each of the metadata pages characterizing a plurality of the user data pages and associating the content-based signatures of those user data pages with respective physical blocks in the storage devices.

3. The apparatus of claim 2 wherein the address space is distributed across the set of storage controllers of the clustered storage system by allocating slices of the address space across the set of storage controllers of the clustered storage system, each slice comprising a set of the content-based signatures.

4. The apparatus of claim 3 wherein the set of storage controllers are configured to decouple release of logical addresses from release of the physical blocks corresponding to the logical addresses, wherein decoupling release of the logical addresses from release of the physical blocks corresponding to the logical addresses comprises at least one of (i) releasing the logical addresses in a different order than the physical blocks corresponding to the logical addresses and (ii) releasing the logical addresses at different times than the physical blocks corresponding to the logical addresses.

5. The apparatus of claim 4 wherein identifying the set of pending input-output requests directed to deletion of data in the clustered storage system comprises identifying pending dereferencing operations for respective ones of the physical blocks corresponding to released logical addresses.

6. The apparatus of claim 1 wherein the at least one processing device is further configured to relocate data in the clustered storage system based at least in part on the modified distribution of the address space.

7. The apparatus of claim 6 wherein the at least one processing device is further configured, for a given portion of data on a first storage device associated with a first one of the set of storage controllers that is part of a first portion of the address space relocated from the first storage device associated with the first storage controller to a second storage device associated with the first storage controller or a second one of the set of storage controllers, to remove the given portion of the data from the first storage device.

8. The apparatus of claim 6 wherein the at least one processing device is further configured to determine if the given content-based signature was in a portion of the address space allocated to the given storage controller prior to the modification of the distribution of the address space.

9. The apparatus of claim 8 wherein the at least one processing device is further configured to update metadata associating the content-based signature with one or more physical blocks in one or more of the storage devices associated with the given storage controller in accordance with the given input-output request responsive to determining that the given content-based signature was in the portion of the address space allocated to the given storage controller prior to the modification of the distribution of the address space.

10. The apparatus of claim 8 wherein the at least one processing device is further configured to determine if the data associated with the given content-based signature has already been relocated from one or more storage devices associated with another one of the set of storage controllers to one or more of the storage devices associated with the given storage controller responsive to determining that the given content-based signature was not in the portion of the address space allocated to the given storage controller prior to the modification of the distribution of the address space.

11. The apparatus of claim 10 wherein the at least one processing device is further configured to update metadata associating the content-based signature with one or more physical blocks in one or more of the storage devices associated with the given storage controller in accordance with the given input-output request responsive to determining that the data associated with the given content-based signature has already been relocated to the storage devices associated with the given storage controller.

12. The apparatus of claim 10 wherein the at least one processing device is further configured to send a request to the other storage controller to update metadata associating the content-based signature with one or more physical blocks in the storage devices associated with the other storage controller in accordance with the given input-output request responsive to determining that the data associated with the given content-based signature has not already been relocated to the storage devices associated with the given storage controller.

13. The apparatus of claim 1 wherein the processing device is implemented in one of:
a host device configured to communicate over a network with at least one storage system that comprises at least one of the set of storage controllers; and
at least one of the set of storage controllers.

14. A method comprising:
in conjunction with an online cluster expansion process for a clustered storage system having an address space distributed across a set of storage controllers each associated with one or more storage devices, modifying the distribution of the address space across the set of storage controllers responsive to adding at least one of compute and storage capacity to the set of storage controllers of the clustered storage system;
identifying a set of pending input-output requests directed to deletion of data in the clustered storage system;
executing the set of pending input-output requests directed to deletion of data in the clustered storage system prior to relocating data in the clustered storage system based at least in part on the modified distribution of the address space;
receiving, at a given one of the set of storage controllers, a given input-output request directed to data associated with a given content-based signature that is in a given portion of the address space allocated to the given storage controller in the modified distribution of the address space; and
modifying a manner in which the given input-output request is processed at the given storage controller based at least in part on whether the given content-based signature was in a portion of the address space allocated to the given storage controller prior to the modification of the distribution of the address space;
wherein the method is implemented by at least one processing device comprising a processor coupled to a memory.

15. The method of claim 14 wherein the storage devices associated with the set of storage controllers of the clustered storage system are configured to store user data pages and metadata pages, each of the user data pages having a logical address and a content-based signature derived from content of that user data page, each of the metadata pages characterizing a plurality of the user data pages and associating the content-based signatures of those user data pages with respective physical blocks in the storage devices, and wherein the address space is distributed across the set of storage controllers of the clustered storage system by allocating slices of the address space across the set of storage controllers of the clustered storage system, each slice comprising a set of the content-based signatures.

16. The method of claim 15 wherein the set of storage controllers are configured to decouple release of logical addresses from release of the physical blocks corresponding to the logical addresses, wherein decoupling release of the logical addresses from release of the physical blocks corresponding to the logical addresses comprises at least one of (i) releasing the logical addresses in a different order than the physical blocks corresponding to the logical addresses and (ii) releasing the logical addresses at different times than the physical blocks corresponding to the logical addresses, and wherein identifying the set of pending input-output requests directed to deletion of data in the clustered storage system comprises identifying pending dereferencing operations for respective ones of the physical blocks corresponding to released logical addresses.

17. A computer program product comprising a non-transitory processor-readable storage medium having stored therein program code of one or more software programs, wherein the program code when executed by at least one processing device causes said at least one processing device:
in conjunction with an online cluster expansion process for a clustered storage system having an address space distributed across a set of storage controllers each associated with one or more storage devices, to modify the distribution of the address space across the set of storage controllers responsive to adding at least one of compute and storage capacity to the set of storage controllers of the clustered storage system;
to identify a set of pending input-output requests directed to deletion of data in the clustered storage system;
to execute the set of pending input-output requests directed to deletion of data in the clustered storage system prior to relocating data in the clustered storage system based at least in part on the modified distribution of the address space;
to receive, at a given one of the set of storage controllers, a given input-output request directed to data associated with a given content-based signature that is in a given portion of the address space allocated to the given storage controller in the modified distribution of the address space; and
to modify a manner in which the given input-output request is processed at the given storage controller based at least in part on whether the given content-based signature was in a portion of the address space allocated to the given storage controller prior to the modification of the distribution of the address space.

18. The computer program product of claim 17 wherein the storage devices associated with the set of storage controllers of the clustered storage system are configured to store user data pages and metadata pages, each of the user data pages having a logical address and a content-based signature derived from content of that user data page, each of the metadata pages characterizing a plurality of the user data pages and associating the content-based signatures of those user data pages with respective physical blocks in the storage devices, and wherein the address space is distributed across the set of storage controllers of the clustered storage system by allocating slices of the address space across the set of storage controllers of the clustered storage system, each slice comprising a set of the content-based signatures.

19. The computer program product of claim 18 wherein the set of storage controllers are configured to decouple release of logical addresses from release of the physical blocks corresponding to the logical addresses, wherein decoupling release of the logical addresses from release of the physical blocks corresponding to the logical addresses comprises at least one of (i) releasing the logical addresses in a different order than the physical blocks corresponding to the logical addresses and (ii) releasing the logical addresses at different times than the physical blocks corresponding to the logical addresses, and wherein identifying the set of pending input-output requests directed to deletion of data in the clustered storage system comprises identifying pending dereferencing operations for respective ones of the physical blocks corresponding to released logical addresses.

20. The computer program product of claim 17 wherein the program code when executed by said at least one processing device further causes said at least one processing device:
  to relocate data in the clustered storage system based at least in part on the modified distribution of the address space; and
  to determine if the given content-based signature was in a portion of the address space allocated to the given storage controller prior to the modification of the distribution of the address space.

* * * * *